United States Patent
Nelson

(10) Patent No.: US 6,292,984 B1
(45) Date of Patent: Sep. 25, 2001

(54) LOAD-SUPPORT SYSTEM EMPLOYING INSTANTANEOUSLY ADJUSTABLE HOOK

(76) Inventor: Bradley E. Nelson, 3010 Millbridge Dr., San Ramon, CA (US) 94683

( * ) Notice: Subject to any disclaimer, the term of this patent is extended or adjusted under 35 U.S.C. 154(b) by 0 days.

(21) Appl. No.: 09/406,337

(22) Filed: Sep. 27, 1999

(51) Int. Cl.$^7$ .................................................. B06P 7/08
(52) U.S. Cl. .................. 24/134 R; 24/265 H; 24/298; 24/136 R; 410/116; 410/100; 410/97; 410/103
(58) Field of Search ............... 410/100, 96, 97, 410/103, 116; 24/265 H, 298, 302, 134 R, 136 R, 115 M, 132 R

(56) References Cited

U.S. PATENT DOCUMENTS

| | | | |
|---|---|---|---|
| 201,035 | * | 3/1878 | Moore .............................. 24/134 R |
| 2,464,319 | | 3/1949 | Kleve . |
| 2,867,026 | | 1/1959 | Gale . |
| 2,942,315 | | 6/1960 | Johnson . |
| 2,998,625 | * | 9/1961 | Huber .............................. 410/97 |
| 3,099,055 | * | 7/1963 | Huber .............................. 410/103 |
| 3,897,161 | | 7/1975 | Reinwall, Jr. . |
| 4,308,643 | * | 1/1982 | Montplaisir ..................... 24/132 R |
| 4,340,998 | | 7/1982 | Liberge . |
| 4,432,121 | | 2/1984 | Dupre . |
| 4,716,630 | | 1/1988 | Skyba . |
| 4,998,327 | | 3/1991 | Hull et al. . |
| 5,035,558 | * | 7/1991 | Prosen .............................. 410/96 |
| 5,133,111 | | 7/1992 | Brown . |
| 5,136,756 | * | 8/1992 | Krauss .............................. 24/265 H |
| 5,146,655 | | 9/1992 | Gibbs . |
| 5,383,259 | | 1/1995 | McIntire . |
| 5,682,652 | | 11/1997 | Brody et al. . |
| 5,993,127 | * | 11/1999 | Shinn .............................. 410/100 |
| 6,059,499 | * | 5/2000 | Bird .............................. 410/103 |

* cited by examiner

Primary Examiner—Stephen T. Gordon
(74) Attorney, Agent, or Firm—J. Robert Cassidy

(57) ABSTRACT

A load-support system for supporting a load employing an instantaneously adjustable hook which is freely slideable along a tie-down or load-support cord to any selected operative position where the hook is positively latched to the cord by turning or twisting the hook relative to the cord to a position wherein the inboard end of the cord exiting from the hook is disposed at an acute included angle relative to the longitudinal axis of the bore in the hook through which the cord extends. Such twisting or turning action serves to bias a latching element in the hook into latched engagement with the cord, preventing loosening—i.e., decrease in tension—of the effective length of the cord yet, at the same time, permitting movement of the cord through the hook in the opposite direction to increase the tension on the effective length of the cord while the hook remains positively latched thereto. The tie-down or load-support system readily permits use of the invention with take-up reels which can be either automatic or manual and of either light weight or heavy duty construction.

4 Claims, 7 Drawing Sheets

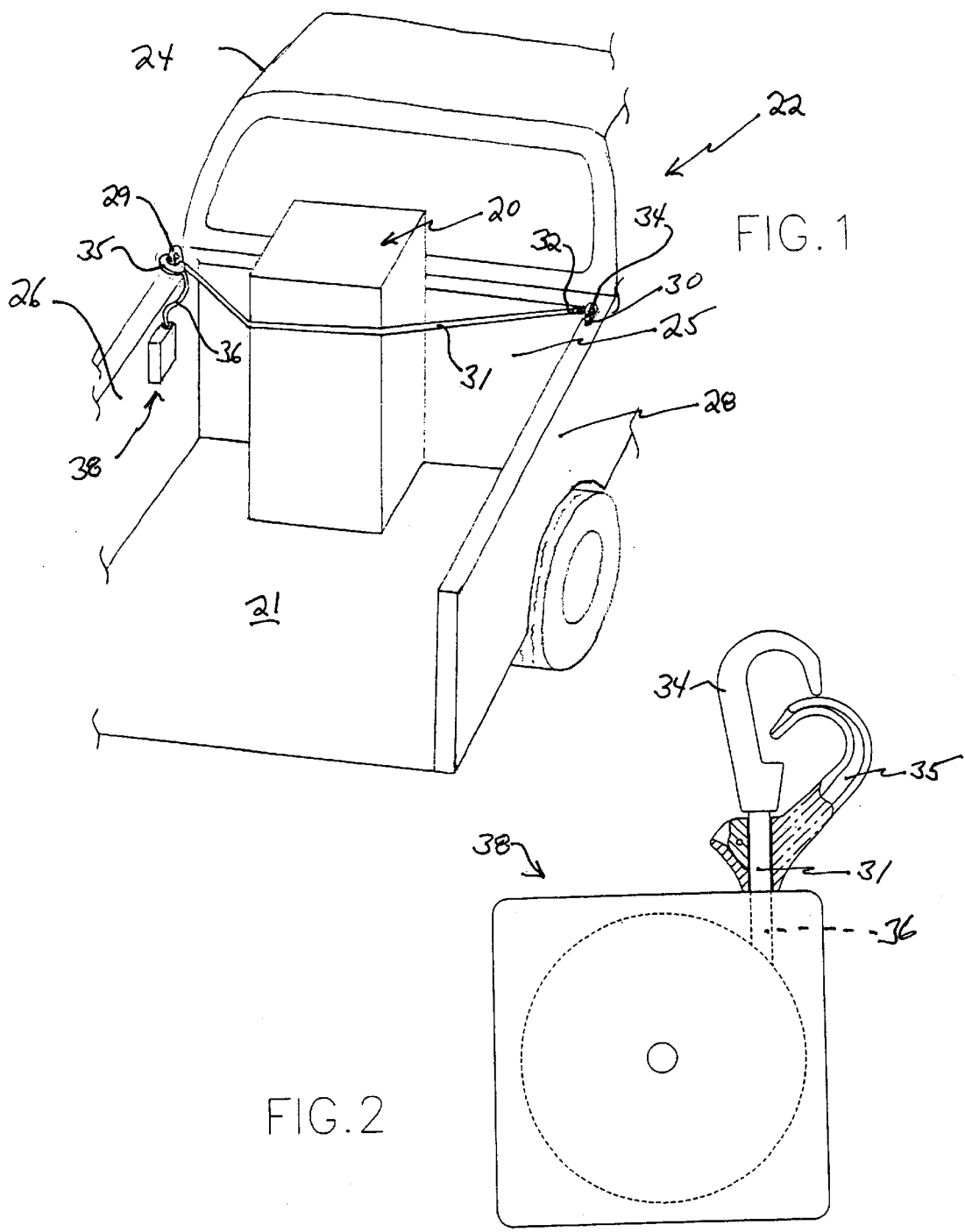

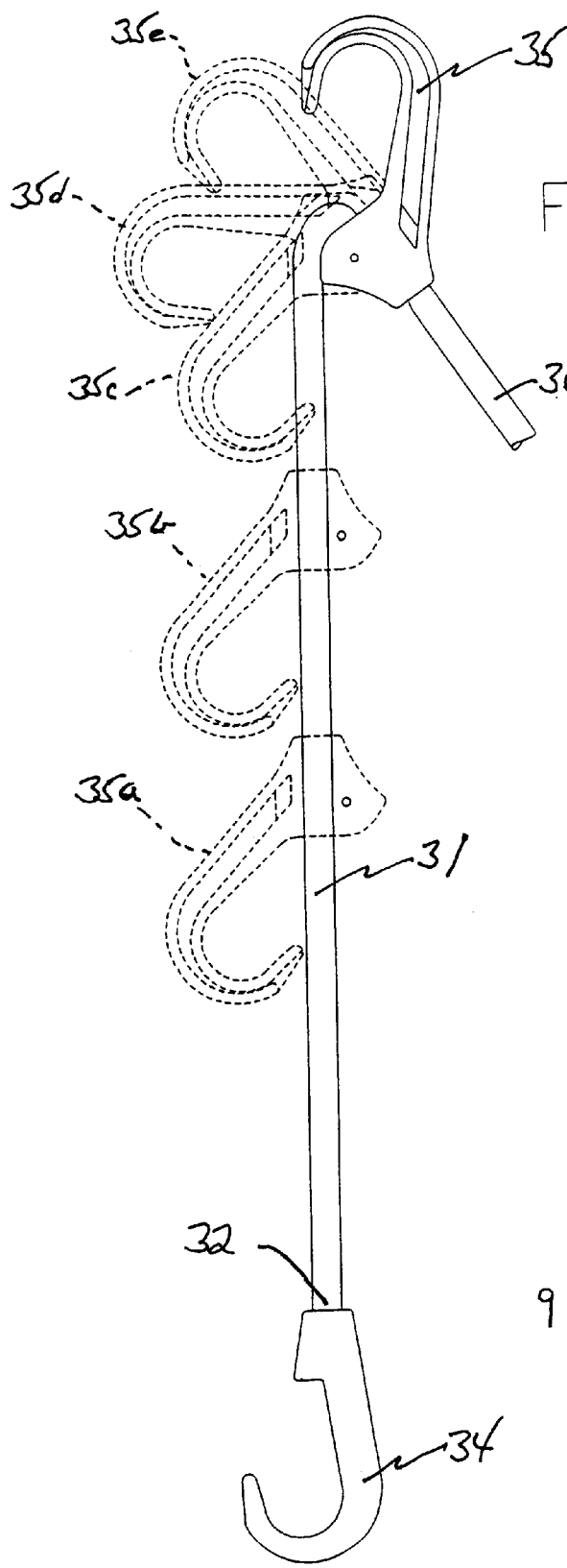
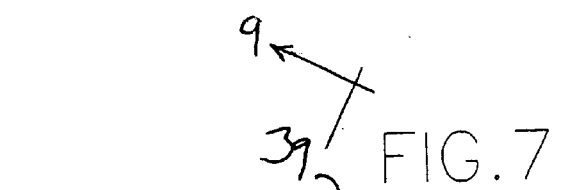

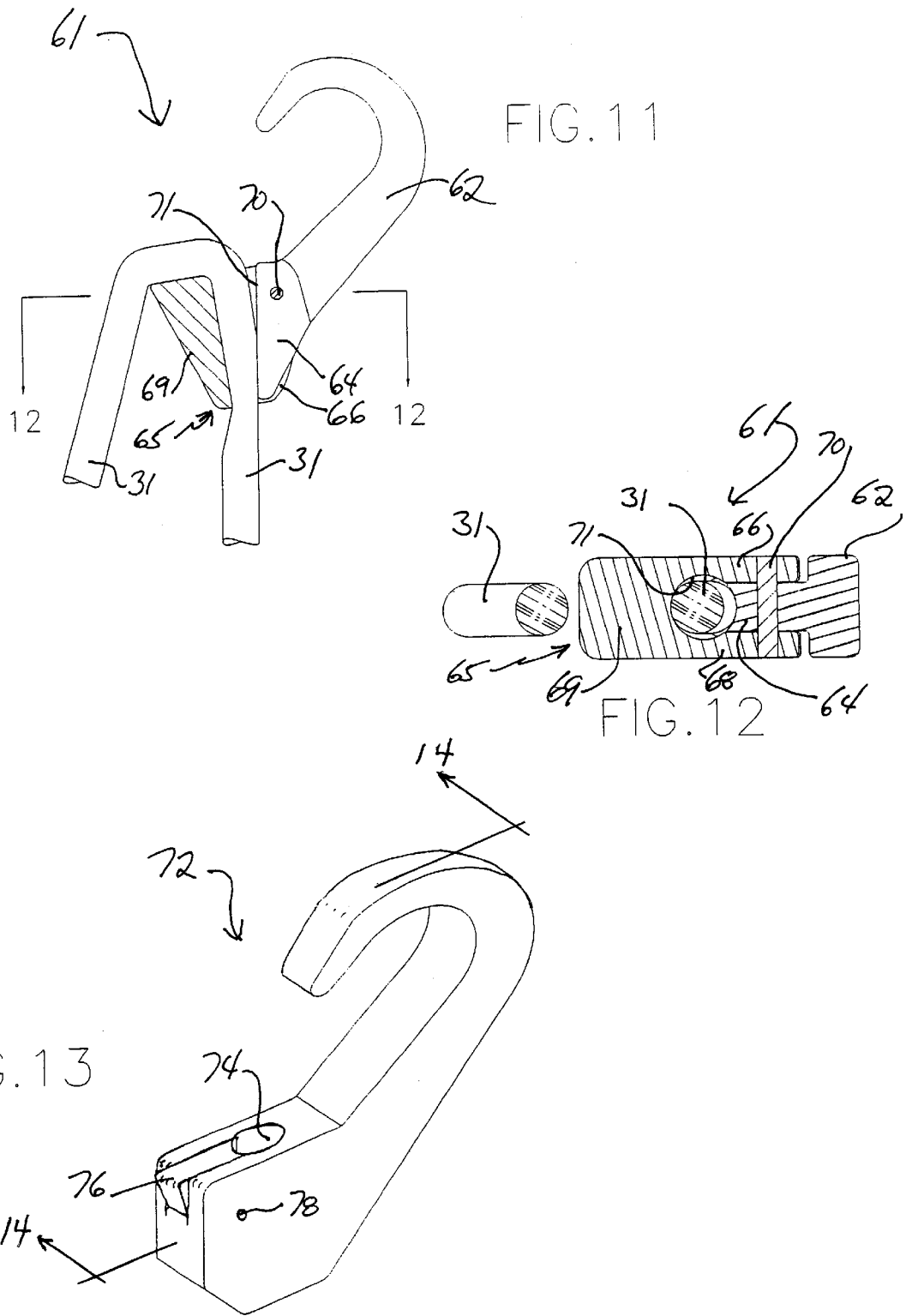

LOAD-SUPPORT SYSTEM EMPLOYING INSTANTANEOUSLY ADJUSTABLE HOOK

BACKGROUND OF THE INVENTION

1. Technical Field

The present invention relates generally to load-support and/or tie-down systems for supporting loads and/or securing loads in, or on, a suitable support structure such, merely by way of example, as in or on a load-carrying truck bed or the like; and, more particularly, to a fixed reel-mounted load-support and/or tie-down rope, cord or line having: i) provisions for permitting attachment of the free outboard end of the rope, cord or line to a fixed structural member; ii), and adjustable hook slideably mounted on the rope, cord or line and attachable thereto wherein the adjustable hook can be released from the rope, cord or line, slid laterally there along to any desired position, and reattached to the rope, cord or line on a virtually instantaneous basis.

As the ensuing description proceeds, those skilled in the art will appreciate that the present invention finds particularly advantageous, but by no means exclusive, use with load-support/tie-down systems of the type employing shock cords or elastic cables with securement hooks—for example, bungee cords or the like—which are commonly known in the art as "sandows" used for holding or securing a wide range of objects having differing sizes, shapes and weights in any of a suspended, static or stationary environment, or in or on moving vehicles such as cars, trucks, boats, planes, motorcycles and the like. However, it will also be apparent to those skilled in the art that the invention finds equally advantageous use with tie-down systems, hoisting devices, and the like of the type employing ropes, cords, lines, webbing, cables and/or wires which have no appreciable elasticity or stretchable properties including ropes, cords, lines, webbing, cables and/or wires formed of natural or synthetic materials, either braided or non-braided. Accordingly, and for purposes of simplicity, the term "cord" will hereinafter be used in the ensuing specification and the appended claims in its broadest possible non-limiting sense to include both elastic and non-elastic load-supporting elements irrespective of whether in the form of: i) webbing; ii) conventional non-elastic braided ropes and/or cords formed of natural or synthetic materials; iii) wire ropes, lines, or cables (either single strand or multiple braided strands); and/or iv), sandows—e.g., conventional resilient shock cords, bungee cords, or similar elastic elements.

The present invention further finds particularly advantageous application with load-support/tie-down systems of the type including automatic take-up reels for the particular cord employed, yet wherein substantially the entire load support is provided by the cord itself and either two or more hooks attached to the cord or at least one hook attached to the cord together with a second attachment mechanism or system at or adjacent the free outboard end of the cord; and, wherein at least one such hook is adjustable—i.e., the hook is: i) freely slideable along the cord to adjust its effective length; and ii), instantaneously lockable to the cord at any desired point without the need for separate locking devices or the use of knots to secure the adjustable hook—yet, wherein: a) the tension on a tensioned cord may be increased without releasing the adjustable hook by simply pulling the inboard end of cord through the latched adjustable hook (this despite the fact that the latched adjustable hook absolutely precludes movement of the cord in the opposite direction relative to the latched adjustable hook, which movement would tend to relax the tension on the effective cord length outboard of the latched adjustable hook); and b), no force or load is applied to the automatic take-up reel at any time, either directly or indirectly.

As a consequence of attaining the foregoing objectives, the present invention enables the ready use of light-weight automatic take-up reels which are neither intended for, nor capable of, being subjected to heavy loads and/or forces and wherein relatively all of the benefits of such automatic take-up reels—e.g.: i) flexibility in terms of the effective cord length enabling securing of loads having a wide range of sizes and/or shapes; ii) convenient storage of the unused portion of the cord during use of the load-support/tie-down system, thus eliminating loose cord ends and the dangers inherent therewith; and iii), protected effective storage of the entire cord during non-use of the load-support/tie-down system. Notwithstanding the foregoing, those skilled in the art will also appreciate that the invention is not limited to use with light-weight automatic take-up reels, but, rather, it can be used with virtually any take-up reel, whether automatic or manual, or whether light-weight or heavy duty.

The phrases "effective length" of the cord or "effective cord length" as used herein and in the appended claims are intended to mean that portion of the cord in engagement with the load to be secured and intermediate two (or more) spaced hooks—or a hook and any conventional spaced attachment mechanism or system at or adjacent the free outboard end of the cord—capable of being secured to fixed structural elements; and, wherein at least one hook is adjustably, but positively, attached to the cord, yet is capable of being disengaged from the cord, slid along its length to increase, or decrease, the effective length of the cord, and reattached to the cord, all by the simple expedient of turning the adjustable hook between: i) a first position wherein the hook is at an acute angle relative to the cord and positively affixed thereto; ii) a second position wherein the hook is not disposed at an acute angle relative to the cord and is freely slideable therealong, and iii), back to the first position; or alternatively, where the effective length of the cord can be decreased by merely pulling the portion of the cord inboard of the adjustable hook through the adjustable hook without releasing the latter from the cord.

Tie-down and/or load-support systems employing the present invention preferably, but not necessarily, employ at least one positively lockable hook of the type capable of being instantaneously released from, or positively affixed to, the cord in such a manner that: i) the cord is not subject to fraying or damage at the point of hook attachment; ii) the loading applied to the effective length of the cord by the object(s) being supported, tied down and/or secured serves to enhance the fixed non-slidable attachment of the cord and adjustable hook at the selected adjustable point of attachment therebetween; and iii), the tension on the effective length of the cord can be increased—i.e., the effective length of the cord can be decreased—simply by pulling the portion of the cord inboard of the adjustable hook through the adjustable hook while the latter remains positively latched to the cord. In other words, the force(s) applied to the cord by the load being secured and/or supported tend(s) to enhance the gripping action between the cord and adjustable hook rather than tending to loosen the tie-down system.

2. Background Art

Those skilled in the art will, of course, appreciate that a wide variety of load-support and/or securement or tie-down systems have been employed for many years. Typically, such conventional systems employ an elastic cord and one or more hooks which is or are "adjustably fixed" to the cord in the sense that a separate manually operated latching system is employed and/or the hook is provided with sinuous or non-linear channels within which the cord must be manually reeved and positioned each time the hook is shifted along the cord to change the effective length of the system. An example of such a system is disclosed in Dupre U.S. Pat. No. 4,432,121. In this arrangement, the patentee employs an elastic cable and a multiplicity of adjustable hooks with the portion of the cable extending between adjustable hooks defining the effective length of the cable used to secure a load or a portion of a load. In order to change the effective length of the cable, it is necessary to: i) remove any tension from the tie-down system; ii) free the cord from the hook locking mechanism; iii) feed the cord into, through and out of a non-linear guide tunnel formed in the hook; and iv), then reset the cord into the hook's locking mechanism. Of course, in the event that the user finds that he/she has not properly and precisely positioned the hook along the cord's length, the foregoing procedure must be repeated. Moreover, the design of the Dupre hook is such that each hook can only be used with a cord of a specific diameter; and, where the user wishes to use the tie-down system with a wide range of different diameter cords, the user must maintain a supply of different sized hooks which are specifically designed for the particular diameter cords to be employed.

In U.S. Pat. No. 4,340,998 issued to Liberge, the patentee provides a sandow device employing a hook with a base having two parallel longitudinal canals or channels defined by a plurality of flanges, with one channel serving to hold the stretched end of the elastic cable and the second channel serving to hold the fixed end of the cable. Thus, the arrangement requires—just as in the aforesaid Dupre patent—that when the user wishes to change the effective length of the elastic cord, the tie-down system must be released from the load to be secured, all tension removed from the hook, and the hook manually shifted to a desired point along the cord and manually reattached thereto. In other words, essentially all of the disadvantages present in Dupre are also found in Liberge; and, in addition, since the free end of the cord is not contained within an enclosed chamber, there exists a real danger that the free end of the cord can be inadvertently pulled or snagged, thus releasing the hook. Moreover, no fail-safe locking arrangement is employed.

Brody et at U.S. Pat. No. 5,682,652 discloses an adjustable tie-down system having an elastic cord and a pair of slidably mounted hooks, wherein at least one hook has a locking mechanism on the body of the hook for resisting movement under load conditions. To this end, one hook includes a tubular member with a flared slot in the wall and a V-shaped bore used to wedge and secure the free end of the elastic cord. Once again, the "adjustable" hook requires that the hook/cord combination be manually set and locked each time length adjustment takes place; and, if the free end of the cord is pulled, or if the user does not correctly lock the cord in place, there is a real danger that the adjustable hook can be inadvertently released under load conditions. Moreover, the Brody et al system is severely limited in the range of cord diameters that can be employed and can cause premature wear of the cord.

In U.S. Pat. No. 2,867,026 issued to Gale, a manually adjustable sling or choker hook is provided for hauling or lifting objects. The adjustable hook receives rope through a channel formed in the hook's body and can be manually moved along the length of the rope. A cam locking mechanism is positioned within the body of the hook for resisting movement of the hook along the length of the rope. However, in Gale the hook does not include any mechanism for resisting movement along the rope under load conditions. Rather, Gale discloses a manually adjustable hook to resist movement under no-load conditions and which is, for all practical purposes, freely moveable along the rope under heavy load conditions.

Other patents of miscellaneous interest include U.S. Pat. Nos.: 2,942,315—Johnson; 4,716,630—Skyba; 5,133,111—Brown; and, 5,146,655—Gibbs. In all of these patents, hooks are provided including rope receiving gaps or channels and cam locking mechanisms. These devices are structurally complex, difficult to assemble, and relatively expensive to manufacture. In each, the cam locking mechanism must be manually held in the "release" position in order to change cord length; and, failure to hold the cam locking mechanism in the "release" position results in excessive wear of the cord as it transits the serrated surface of the locking mechanism.

Kleve U.S. Pat. No. 2,464,419 discloses an adjustable hook employing an eccentric eye that presses a moveable jaw against a clevis. The motion of the hook relative to the clevis necessary for locking action can be easily interrupted, allowing inadvertent release. Movement of the hook and clevis relative to one another makes the device unsuitable for use as a sandow; and, moreover, the system is capable of inadvertent locking at any time, particularly when attempting to rewind the cord using an automatic take-up reel.

Another prior art locking device for ropes is disclosed in Reinwall, Jr. U.S. Pat. No. 3,897,161 wherein the assembly includes a plurality of moveable gripper arms having arm release levers that must be manually held in the "release" position in order to alter the effective length of the cord. The effective length of the cord can be shortened by simply pulling on the free end of the cord while under tension. The system, because of its complexity and numerous components, is cumbersome and expensive, and is generally limited to use with a narrow range of cord diameters.

Hull et. al. U.S. Pat. No. 4,998,327 discloses a traction hook and rope lock employing a channel and pivotable member with a rope engaging surface. Again, the cord must be manually locked in place each time adjustment of the cord's effective length occurs.

McIntire U.S. Pat. No. 5,383,259 discloses a hook device including a tapered collet inserted in the hook body. When an elastic cord is stretched, its diameter decreases, thus enabling a stretched elastic cord to be moved freely through the body of the hook and collet to any desired position. When the tension on the cord is released—i.e., it is no longer stretched—the cord diameter increases to its normal diameter and is thus frictionally locked in place in the collet. Consequently, when in use, any increase in tension or loading of the cord can, and normally will, result in stretching of the cord and reduction of the cord's diameter, thereby increasing the danger of inadvertent slippage of the hook along the cord.

Thus, it can be seen that none of the numerous prior art devices described above discloses an adjustable tie-down or load-support system employing an adjustable hook which is freely slideable along the cord to increase or decrease the effective cord length without the need to remove tension from the cord or to disengage the cord from the load being secured or, alternatively, where the effective cord length can be decreased simply by pulling the free inboard end of the cord inboard of the adjustable hook through the latter while the hook remains positively locked thereto; yet, wherein the hook can be instantaneously locked to the cord at any desired position along the cord's length merely by turning the hook at an acute angle relative to the cord itself. Rather, the various prior art devices described above are generally subject to one or more—and usually many—of the following disadvantages: i) they employ multiple components requiring complex and costly assembly; ii) they are limited to use with cords of a specific diameter or cords falling within a narrow range of diameters; iii) the tie-down or load-support system must be unhooked in order to permit adjustment of the hook along the cord to change its effective length while under no-load or tension-free conditions; iv) the hooks cannot be adjusted under load conditions; v) the cord is subject to fraying and/or damage at the point where it engages the hook latching mechanism; and vi), the tie-down and/or load-support systems are not compatible for use with automatic take-up reels.

SUMMARY OF THE INVENTION

The present invention relates to an improved, simplified, highly versatile load-support and/or tie-down system and adjustable hook therefor which overcomes all of the foregoing disadvantages inherent in the prior art and which is characterized by its ability to permit increase or decrease in the effective length of the cord, while under tension, by the simple expedient of sliding the adjustable hook along the cord to a desired position, and then simply turning the hook at an acute angle relative to the cord so as to positively lock the hook to the cord in a fail-safe position which will remain securely attached to the cord irrespective of any increase or decrease in the cord tension either over the effective length of the cord or at the free end of the cord; or, alternatively, where the effective length of the cord can be decreased—e.g. the tension increased—simply by pulling the free inboard end of the cord inboard of the adjustable hook through the latter while the adjustable hook remains positively locked to the cord.

More specifically, it is a general aim of the present invention to provide simple, highly versatile, load-support and/or tie-down methods and apparatus employing either: i) two or more hooks; or ii), at least one hook in combination with any conventional attachment mechanism/system at or adjacent the outboard end of the cord, all for attachment to fixed structural members at spaced points wherein at least one hook is adjustable, but positively lockable, to the cord and can be released from the cord when the cord is under tension, slid along the tensioned cord, and re-attached to the cord in a positive locked arrangement by the simple expedient of shifting the adjustable hook from a first position wherein it is disposed at an acute included angle relative to the cord and latched thereto, to a second position wherein it is not disposed at an acute angle relative to the cord and is freely slideable along the cord to a new predetermined position, and then positively latched to the cord by again simply turning the hook to an acute included angle relative to the cord; or, alternatively, where it is desired to increase the tension on the effective length of the cord—i.e., to shorten the effective length of the cord—one need merely pull the inboard end of the cord through the adjustable hook while the hook remains positively latched to the cord.

As a result of attaining the foregoing objective, tie-down and/or load-support systems embodying the present invention are not subject to inadvertent release simply because the tension either over the effective cord length or at the free inboard end of the cord is either increased or decreased. In short, changes in loading over the effective length of the cord or due to snagging or pulling of the free inboard end of the cord have absolutely no bearing upon the latched security of the adjustable hook/cord combination which can only be released by disengaging the adjustable hook from the fixed structural member and turning the hook so that it is no longer disposed at an acute included angle relative to the cord and is, therefore, freely slideable therealong in either direction.

It is a further object of the invention to provide an improved adjustable hook for use in a load-support and/or tie-down system wherein the hook is universal in the sense that it can be effectively used with cords of virtually any diameter and irrespective of whether the cord is elastic, non-elastic, braided, or non-braided, webbing, or the like. As a consequence, it is no longer necessary to stock a wide variety of different size hooks which are specifically designed to be compatible with each different type and/or diameter of cord to be used but, rather, it is only necessary to tool up to make one hook (or a few hooks) which is (are) compatible for use with virtually any of the normally used cord diameters.

Another important objective of the present invention is the provision of an adjustable tie-down and/or load-support system wherein substantially the entire load support is provided by the effective length of the cord intermediate either: i) two or more hooks, at least one of which is adjustable; or ii), an adjustable hook and a conventional attachment mechanism or system at or adjacent the outboard end of the cord; and, wherein: iii) the adjustable hook is secured to a fixed structural member; and iv), no load is applied to the free inboard end of the cord, thereby permitting the free inboard end of the cord to be attached to either: a) a light-weight, inexpensive, automatic take-up reel which does not have to provide any load support function; or b), any other type of conventional take-up reel.

DESCRIPTION OF THE DRAWINGS

These and other objects and advantages of the present invention will become more readily apparent upon reading the following Detailed Description and upon reference to the attached drawings, in which:

FIG. 1 is a fragmentary isometric view of the rear end of a conventional pick-up truck here depicting a load secured or tied-down within the pick-up truck bed using a cord having: i) its outboard end secured to a hook which is, in turn, attached to one side of the bed defining a portion of the truck's frame with the cord being wrapped about the object (s) to be secured; ii) a second adjustable hook attached to an inboard portion of the cord and secured to the opposite side of the truck's bed-defining frame; and iii), wherein the free inboard end of the cord extends into an automatic take-up reel mounted on the side of the truck;

FIG. 2 is a side elevational view, partly in section, here illustrating a typical automatic take-up reel and load supporting cord wound thereon with the outboard end of the cord having a first hook fixedly secured thereto and a second hook adjustably secured to the cord and slideable therealong with the second hook disposed between the first fixed hook and the take-up reel;

FIG. 7 is an isometric view of one embodiment of the adjustable hook as shown in FIGS. 1 through 6;

FIG. 8 is a side elevational view here depicting movement of the adjustable hook along the length of the cord through a series of slideable positions shown in dotted lines to a fixed latched position shown in solid lines;

FIG. 11 is a side elevational view, partly in section and taken substantially along the line 11—11 in FIG. 10, here illustrating the adjustable hook of FIG. 10 positively latched to a cord;

FIG. 12 is a sectional view taken substantially along the line 12—12 in FIG. 11 and showing details of the hook's latching mechanism;

FIG. 13 is an isometric view of still another modified form of adjustable hook embodying the present invention;

Figure 3:
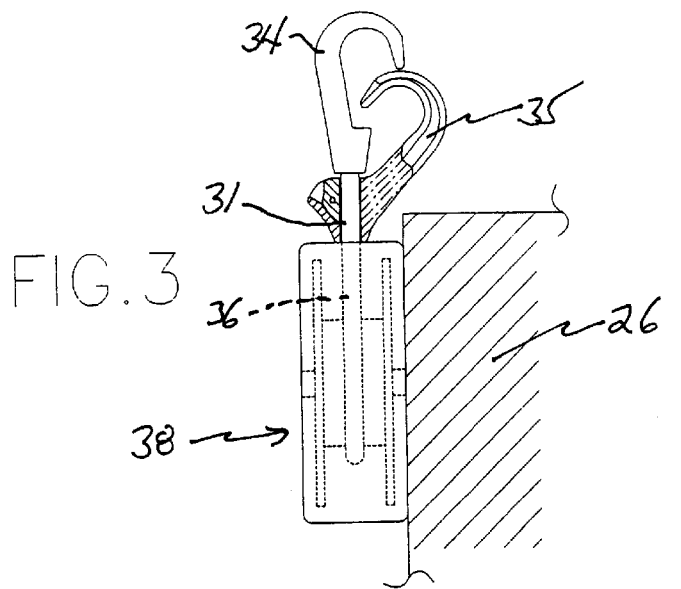
FIG. 3 is a fragmentary end view, partly in section, of the pick-up reel, cord and hooks mounted on the pick-up truck's bed sidewall as shown in FIG. 1, here depicting the cord and hooks in their fully retracted and stowed positions.

While the invention is susceptible of various modifications and alternative forms, specific embodiments thereof have been shown by way of example in the drawings and will herein be described in detail. It should be understood, however, that it is not intended to limit the invention to the particular forms disclosed; but, on the contrary, the intention is to cover all modifications, structural equivalents, equivalent structures, and/or alternatives falling within the spirit and scope of the invention as expressed in the appended claims. Thus, in the appended claims, means-plus-function-clauses and similar clauses are intended to cover: i) the structures described herein as performing a specific recited function; ii) structural equivalents thereof; and iii), equivalent structures thereto. For example, although a nail and a screw may not be deemed to be structural equivalents since a nail employs a cylindrical surface to secure wooden parts together while a screw employs a helical surface, in the art broadly pertaining to fastening of wooden parts, a nail and a screw should be deemed to be equivalent structures since each performs the recited fastening function.

DETAILED DESCRIPTION

Turning now to the drawings, and directing attention first to FIGS. 1–3—but especially FIG. 1—the present invention has been depicted in an environment wherein a load—here a box or carton generally indicated at 20—has been secured on the load-carrying bed 21 of a conventional pick-up truck, a fragmentary portion of which is generally illustrated at 22.

Thus, the pick-up truck 22 is of the type including a cab 24, a front wall 25, and left and right sidewalls 26, 28 respectively. As here shown, the pick-up truck 22 is provided with a plurality of securement members integral with the sidewalls at 26, 28—e.g., cleats, hand holds, or as here shown, hook eyes 29, 30 welded, bolted or otherwise integrally secured to respective ones of the sidewalls 26, 28.

As the ensuing description proceeds, those skilled in the art will appreciate that the load to be secured—e.g., here shown as a box or carton 20—can take a variety of forms. For example, multiple boxes or cartons of different sizes can be loaded on the pick-up bed 21 of the truck—or, upon any other suitable support member—rather than the single carton shown. Moreover, the load 20 may include numerous other items such, merely by way of example, as golf clubs, furniture, tools, lumber, construction materials, and the like. However, for simplicity, the exemplary load has been shown as consisting of a single box or carton 20.

In order to secure the box or carton 20 against the front wall 25 of the pick-up truck 22 in accordance with the present invention, a tie-down cord 31 is provided wherein the free outboard end 32 of the cord includes an integral non-adjustable hook 34 here secured to the hook eye 30 on the right sidewall 28 of the truck 22. Of course, while not shown in the drawings or otherwise described herein in detail, those skilled in the art will appreciate as the ensuing description proceeds that the non-adjustable hook 34 can be replaced with any suitable and well-known conventional attachment mechanism or system such, for example, as an integral cord loop, other cord enlargement, and/or simply by tying off the free outboard end 32 of the cord 31 to the hook eye 30 or other structural fastening device. In either case, the tie-down cord 31 extends laterally from the right sidewall 28 towards the opposite or left sidewall 26 of the pick-up truck 22—i.e., from right to left as viewed in FIG. 1—where an adjustable hook 35 embodying features of the present invention is securely clamped to the cord 31 and attached to an adjacent hook eye 29 integral with the left sidewall 26. As best shown in FIGS. 1–3, the portion 36 of the tie-down cord 31 inboard of the adjustable hook 35 extends downwardly to an automatic take-up reel, generally indicated at 38, mounted on the inside of sidewall 26. Thus, the arrangement is such that the portion of the tie-down cord 31 intermediate the exemplary non-adjustable hook 34 and the adjustable hook 35 comprises the effective length of the tie-down cord 31 and is under tension, whereas the portion 36 of the tie-down cord 31 inboard of the adjustable hook 35—i.e., the portion of cord 31 intermediate the adjustable hook 35 and the automatic take-up reel 38—is not under tension; but, rather, substantially all forces imposed on the effective length of the tensioned tie-down cord 31 are transmitted via hooks 34, 35 and securement members 30, 29 to respective ones of the sidewalls 26, 28 of the pick-up truck 22.

Figure 9:
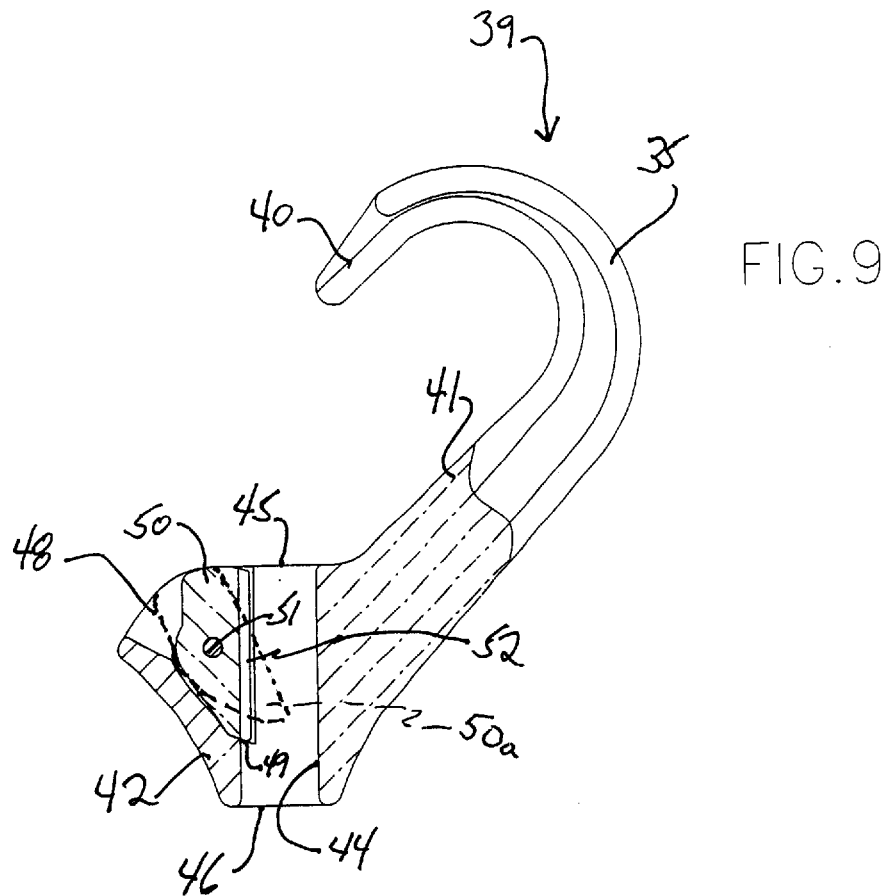
FIG. 9 is a side elevational view, partly in section and taken substantially along the line 9—9 in FIG. 7, here showing details of the adjustable hook of FIGS. 1 through 8 with the hook's internal pivoted latch plate shown in a first limit position in solid lines and in a second limit position in broken lines.

Having in mind a typical environment wherein the present invention finds particularly advantageous, but by no means exclusive, use—i.e., in a load tie-down system of the type illustrated by way of example in FIG. 1—attention will now be directed to the structural and operational details of one illustrative embodiment of an adjustable hook 35 embodying features of the present invention. Thus, as best shown in FIGS. 7 and 9—but shown in particular detail in FIG. 9—the exemplary adjustable hook 35 of FIG. 1 includes a U-shaped hook portion, generally indicated at 39, terminating in a short leg 40 and a generally parallel spaced long leg 41 with the free end of leg 41 terminating in a hook base portion 42. In carrying out this aspect of the present invention, the base portion 42 of the adjustable hook 35 includes a through bore 44 dimensioned to permit free slideable transit of any suitable cord such, for example, as the exemplary tie-down cord 31 depicted in FIGS. 1–3. The through bore 44 includes: i) a cord inlet end 45 at the bore end closest to the short leg 40; and ii), a cord outlet end 46 at the bore end remote from the short leg 40. Additionally, the base portion 42 of the exemplary adjustable hook 35 includes and an outwardly flaring generally V-shaped channel 48 intersecting the axis of bore 44 with the apical end 49 of the V-shaped channel 48 being spaced from, and slightly inboard of, the cord outlet end 46 of the bore 44.

Figure 5:
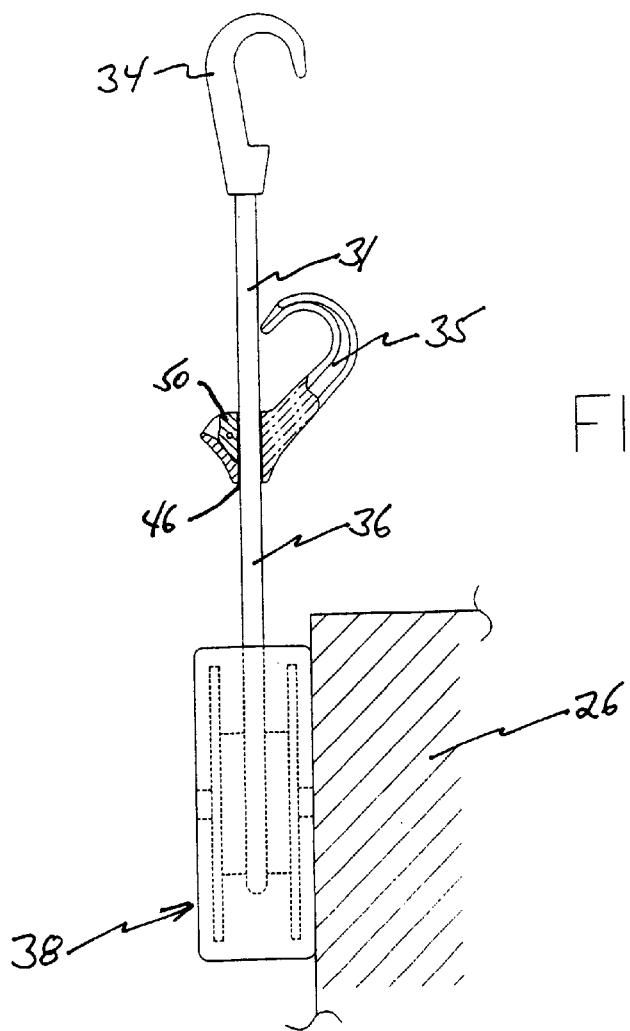
FIG. 5. is a fragmentary end view, partly in section, similar to FIG. 3, but here illustrating the cord partially unwound from the take-up reel with the adjustable hook slideably mounted therealong.
Figure 6:
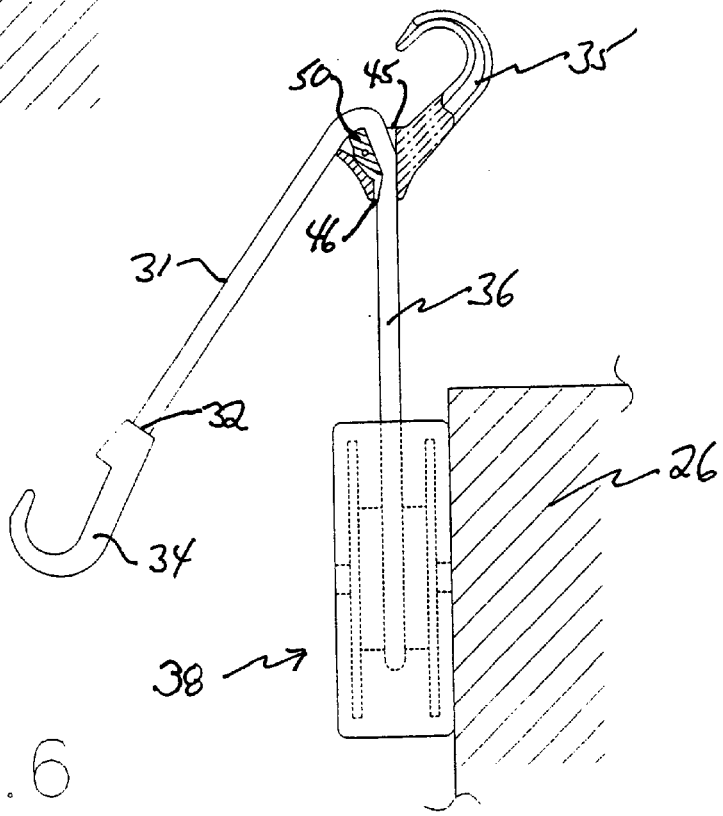
FIG. 6 is a fragmentary end view similar to FIG. 5, but here illustrating locking of the adjustable hook to the cord at a fixed position by simply turning the adjustable hook and cord to an acute included angle relative to one another.

Finally, and in keeping with one aspect of the present invention, a latch element in the form of a latch plate 50 is pivotally mounted within the V-shaped channel 48 by any suitable pivot pin 51 having its opposite ends fixedly mounted in the base portion 42 of the adjustable hook 35. It will be noted upon inspection of FIGS. 5 and 9, that with the latch plate 50 in the solid line first limit position shown in the FIG. 9, the inner wall 52 of the latch plate 50 defines a portion of the wall of the bore 44 (which is here shown as being of substantially constant diameter); and, in this first limit position, the adjustable hook 35 is freely slideable in either direction along any cord (not shown in FIG. 9 but shown as cord 31 in FIGS. 3 and 5) extending through the substantially constant diameter bore 44. However, when the latch plate 50 is pivoted—e.g., in a counterclockwise direction as viewed in FIG. 9—from the solid line first limit position to the broken line second limit position indicated at $50_a$ in FIG. 9 (c.f., FIG. 6), the end of the latch plate 50 closest to the cord outlet end 46 of bore 44 projects into the bore, substantially constricting the bore 44, and thus tightly clamping any cord (not shown in FIG. 9; but, a cord such as the tie-down cord 31 shown in FIGS. 1 and 6) within the constricted bore 44 and thereby preventing movement of the adjustable hook 35 along the cord in a direction that would lengthen the effective tensioned cord length outboard of the cord outlet end 46 of the bore 44. To enhance gripping action between the latch plate 50 and the cord 31, the inner wall 52 of the latch plate 50 may be ribbed, knurled or otherwise roughened (not shown in the drawings).

Thus, and as best observed by reference to FIGS. 1 and 8 in conjunction, in operation the user will: i) secure the fixed hook 34 at the outboard end of the tie-down cord 31 to the hook eye 30 on the right sidewall 28 of the pick-up truck's bed 21 (FIG. 1); ii) pull the tie-down cord 31, which is maintained under tension, about the load 20 to be secured: and iii), slide the adjustable hook 35 along the tie-down cord 31 toward the opposite or the left sidewall 26 of the pick-up truck bed 21—i.e., from right to left as viewed in FIG. 1 and from bottom to top through the successive unlatched positions 35a, 35b and 35c as viewed in FIG. 8. When the adjustable hook 35 is adjacent hook eye 29 on left sidewall 26—e.g., when it is in the position indicated at 35c in FIG. 8—the adjustable hook 35 is turned relative to the tie-down cord 31 (in a clockwise direction as viewed in FIG. 8) from the position shown at 35c successively through the positions shown in broken lines at 35d and 35e to the solid line position indicated at 35. In this position, it will be noted that the inboard portion of the tie-down cord 31 exiting from the cord inlet end 45 of the bore 44 (see FIGS. 8 and 9) is disposed at an acute included angle with respect to the longitudinal axis of the bore, thus shifting the latch plate 50 from the solid line position shown in FIG. 9 to the broken line position indicated at 50a and firmly latching the adjustable hook 35 to the tie-down cord 31 adjacent hook eye 29 on the pick-up truck left sidewall 26. The adjustable hook 35 is then firmly attached to the hook eye 29 so as to the secure the load 20 against the front wall 25 of the truck bed 21.

If, at this point, the user wishes to increase the tension of the tie-down cord 31—i.e., to shorten the effective cord length between the hook eyes 29, 30—it is merely necessary to pull the portion of the tie-down cord 31 inboard of the adjustable hook exiting from the outlet end 46 of the bore 44 (FIG. 9; c.f. FIG. 8) through the adjustable hook while the latter remains firmly clamped to the tie-down cord 31 and fixedly attached to the hook eye 29.

Figure 4:
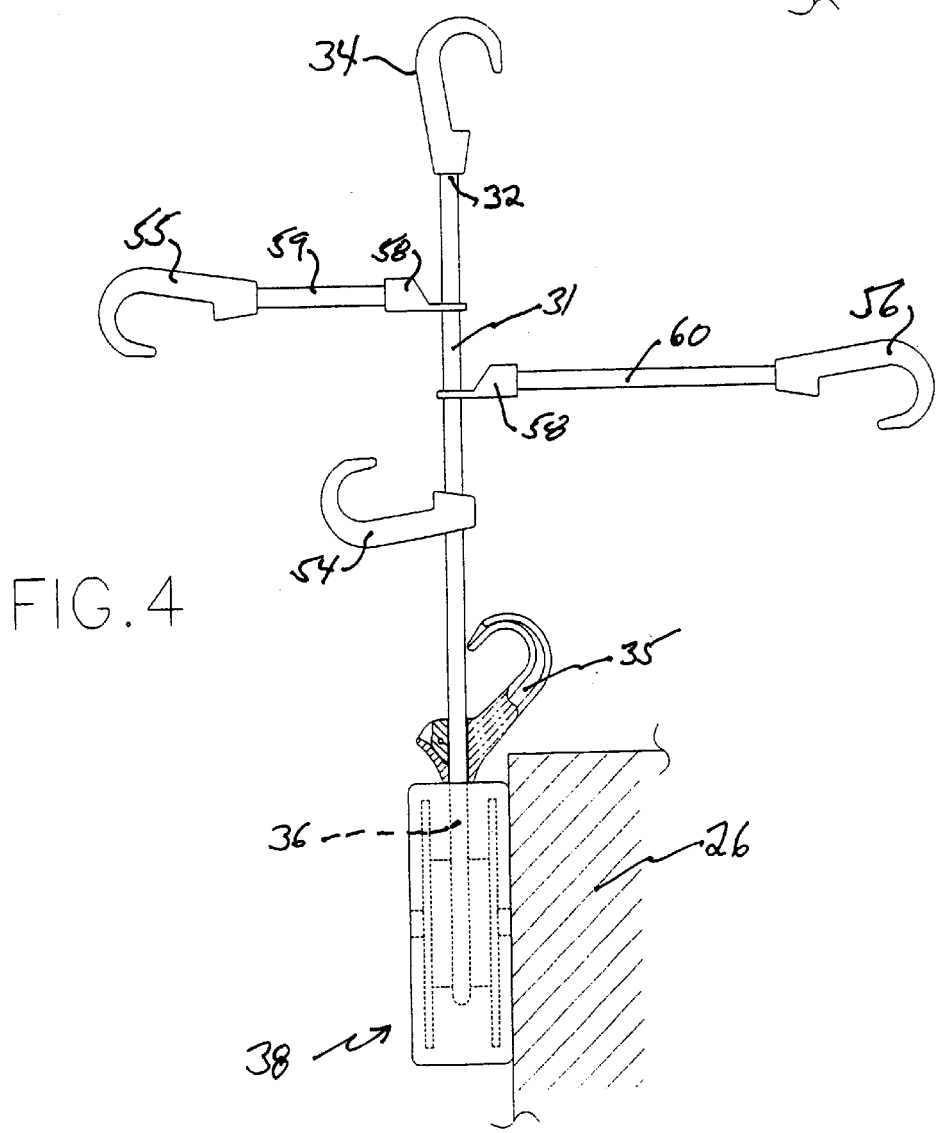
FIG. 4. is a fragmentary end view, partly in section, similar to FIG. 3 but here showing a plurality of additional hooks slideably secured to the cord intermediate the outboard fixed hook and the inboard adjustable hook.

Referring next to FIG. 4, it will be noted that multiple additional nonadjustable hooks 54, 55, 56 can be slideably mounted on the tie-down cord 31 intermediate the fix and adjustable hooks 34, 35. As here shown, hook 54 is slideably mounted directly on the tie-down cord 31 itself; hook 55 is slideably mounted on the tie-down cord 31 by means of a slideable fitting 58 and a short length of cord 59; while hook 56 is slideably mounted on the tie-down cord 31 by means of a second slideable fitting 58 and a somewhat longer length of cord 60. Thus, there is provided a high degree of flexibility wherein loads consisting of multiple objects (not shown) can be secured not only by the tie-down cord 31 and the fixed and adjustable hooks 34, 35 but, additionally, by one or more intermediate slideable hooks—e.g., hooks 54, 55, and/or 56 (or still further hooks, not shown)—which can be interposed between the fixed and adjustable hooks 34, 35 and attached to securement members on the load support intermediate such multiple objects.

Figure 10:
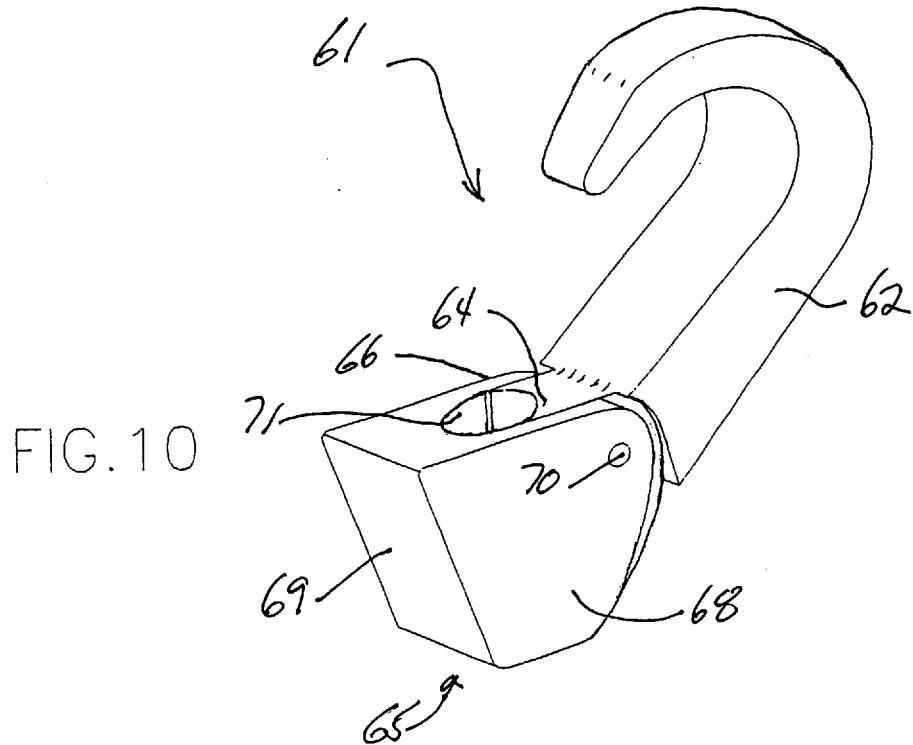
FIG. 10 is an isometric view similar to FIG. 7, but here illustrating a slightly modified adjustable hook embodying features of the present invention.

Considering next FIGS. 10–12 conjointly, a slightly modified form of adjustable hook, generally indicated at 61, has been illustrated. Thus, in keeping with the broad aspects of the present invention, adjustable hook 61 includes a hook portion 62 terminating in a blade-like flange 64. A generally U-shaped bracket, generally indicated at 65, having parallel spaced plate-like flanges 66, 68 and a connecting base portion 69 is pivotally mounted on the hook 61 by a pivot pin 70 passing through the spaced plate-like flanges 66, 68 and the blade-like flange 64 which projects between the plate-like flanges 66, 68. Thus, the arrangement is such that the U-shaped bracket 65 and blade-like flange 64 define a through bore 71 through which the tie-down cord 31 reeved. Consequently, when the tie-down cord 31 and hook 61 are positioned relative to one another so that the inboard end of the cord defines an acute included angle with respect to the longitudinal axis through the bore 71, the U-shaped bracket 65 is pivoted (counter-clockwise as viewed in FIG. 11) so as to constrict the outward end of the bore 71 and tightly clamp the hook 61 through the cord 31, precluding movement of the cord out of the hook 61 in a direction which would lengthen the effective cord length while, at the same time, permitting movement of the cord 31 in the opposite direction while the hook 61 is clamped to the cord 31 so as to shorten the effective cord length and increase the tension thereon.

Figure 14:
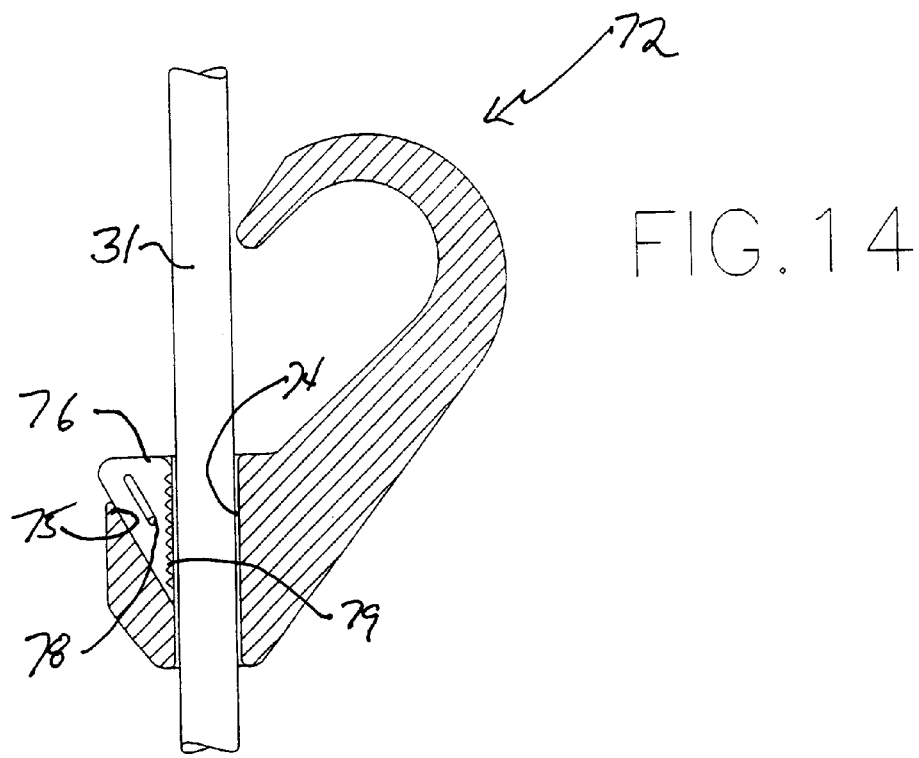
FIG. 14 is a side elevational view, partially in section and taken substantially along the line 14—14 in FIG. 13, here illustrating details of the modified adjustable hook depicted in FIG. 13; and, FIG. 15 is a side elevational view, partially in section, of yet another modified hook embodying features of the present invention.

Yet another modified form of adjustable hook, generally indicated at 72, and also embodying features of the present invention, has been illustrated in an exemplary form in FIGS. 13 and 14. Thus, as here shown, the hook 72 includes a through bore 74 (FIG. 14) having a generally V-shaped channel 75 formed in the hock in a plane intersecting the bore 74. A triangular latching element 76 is positioned within the V-shaped channel 75 and slideably attached thereto by means of a pin 78. The inner wall 79 of the latch element 76, which defines a portion of the wall of bore 74, is preferably toothed, knurled or otherwise roughened so as to enhance gripping action between the hook 72 and the tie-down cord 31. The arrangement is such that the user need merely twist the hook 72 relative to the cord 31 so that the cord extending from the inlet end of the bore 74 defines an acute included angle with the longitudinal axis passing through the bore. This forces the latching element 76 downwardly into the V-shaped channel 75, firmly latching the hook 72 to the cord 31 in the manner previously described, causing the toothed, knurled of roughened wall 79 of the latch element 76 to clampingly engage the cord 31, thus latching the hook 72 to the cord 31.

Figure 15:
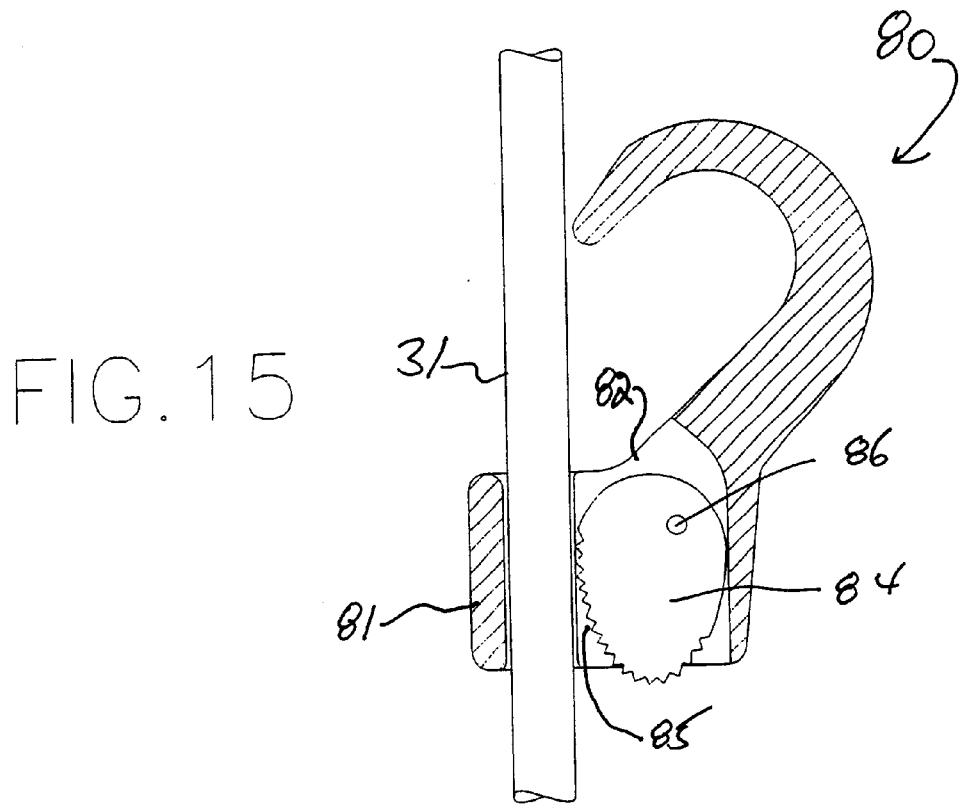

Yet another modified adjustable hook configuration has been generally indicated at 80 in FIG. 15. In this form of the invention, the base 81 of the hook 80 is provided with enlarged through bore 82. An eccentric latch element 84 having a toothed, knurled, or roughened outer wall 85 is pivotally mounted within the enlarged bore 82 by a suitable off-center pivot pin 86. Thus, the arrangement is such that twisting or turning of the hook 80 relative to a tie-down cord 31 in the manner previously described causes the eccentric latch element 84 to pivot about pin 86, clamping the hook 80 to the cord 31.

What is claimed is:

1. An adjustable hook for use with load-supporting cords, said hook having:
    a) a U-shaped hook portion terminating in a first relatively short integral leg and a second relatively long integral leg wherein said first and second legs are spaced apart, said second relatively long integral leg terminating at its free end in a hook base portion; and,
    b) means defining a latch pivotally mounted on said hook base portion for pivotal movement between first and second limit positions, said latch defining means and said hook base portion forming a bore having: i) a linear axis lying in a plane containing at least said second relatively long leg; ii) a cord outlet at the end of said bore remote from said first relatively short leg; and iii), a cord inlet at the end of said bore closest to said first relatively short leg;
    whereby: i) when said latch defining means is in said first limit position, said bore is characterized by having a substantially uniform diameter throughout its axial length so as to permit a cord to be passed freely through said bore with said adjustable hook being slideable in either direction along and relative to the cord; ii), when said latch defining means is pivoted relative to said hook base portion from said first limit position to said second limit position, the end of said latch defining means closest to said cord outlet end of said bore shifts inwardly toward said bore axis, reducing the diameter of said bore adjacent said cord outlet ends and clamping the cord within the reduced diameter end of said bore so as to prevent movement of the cord from said cord inlet end of said bore through said cord outlet end of said bore while permitting movement of the cord from said cord outlet end of said bore through said cord inlet end; and iii), wherein disposition of the cord on a line substantially co-axial with said bore axis and exterior of said cord inlet end of said bore permits free slideable movement of said adjustable hook along and relative to the cord in either direction, while shifting of that portion of the cord exterior to said cord inlet end of said bore to a position defining an acute included angle with respect to said bore axis serves to pivot said latch defining means from said first limit position to said second limit position and to maintain said latch defining means in said second limit position.

2. An adjustable hook as set forth in claim 1 wherein said hook base portion includes an internal flared channel extending laterally from said bore, said internal flared channel terminating at its narrowest point adjacent said cord outlet end of said bore and at its widest point adjacent said cord inlet end of said bore; said latch defining means comprising a flat latch plate positioned within said internal flared channel and pivotally mounted on said base portion with freedom for pivotal movement between said first and second limit positions; said flat latch plate having an internal wall which: a) when said latch plate is in said first limit position, said internal wall of said latch plate defines a wall of said bore wherein said bore is of substantially constant diameter from said cord inlet end to said cord outlet end and, therefore, said adjustable hook is freely slideable in either direction relative to a cord passing through said bore; and b), when said latch plate is pivoted into said second limit position, the end of said latch plates internal wall closest to said cord outlet end of said bore projects into said bore, reducing the diameter of said bore adjacent said cord outlet end and causing said latch plate to clamp the cord against said base portion of said hook so as to preclude movement of the cord from said cord inlet end of said bore through said cord outlet end, of said bore; and,
    wherein said flat latch plate is shifted from said first limit position to said second limit position by twisting said adjustable hook so that the portion of the cord projecting out of said cord inlet end of said bore is at an acute included angle relative to the axis of said bore, thereby pivoting said flat latch plate into, and maintaining said flat latch plate in, said second limit position.

3. An adjustable hook as set forth in claim 1 wherein said hook base portion comprises a flat blade-like flange of reduced thickness and said latch defining means comprises a generally U-shaped member having a transverse base and a pair of parallel plate-like flanges spaced apart by a distance sufficient to permit insertion of said flat blade-like flange of said base portion therebetween, said generally U-shaped member being pivotally mounted on said flat blade-like flange of said base portion with freedom for pivotal movement between said first and second limit positions with said transverse base being spaced from said flat blade-like flange; and, said transverse base, said flat blade-like flange, and said parallel plate-like flanges defining said bore;
    whereby, when said generally U-shaped member is in said first limit position, said bore is of substantially constant diameter from said bore outlet end to said bore inlet end and said adjustable hook is, therefore, freely slideable relative to a cord extending therethrough, and when said generally U-shaped member is pivoted relative to said base portion from said first limit position to said second limit position, said transverse base of said generally U-shaped member projects into said bore, reducing the diameter of said bore adjacent said bore outlet end so as to clamp the cord to said base portion and thereby preclude relative sliding movement of the cord from said cord inlet end of said bore towards said cord outlet of said bore; and, wherein said generally U-shaped member is pivoted from said first limit position to said second limit position by twisting said hook relative to the cord so that the end of the cord projecting out of said cord inlet end of said bore is at an acute included angle with respect to the axis of said bore.

4. An adjustable hook for use with load-supporting cords, said hook having:
    a) a U-shaped hook portion terminating at one end in a base portion;
    b) a through bore formed in said base portion with said U-shaped hook portion extending laterally from said base portion and the axis of said bore;
    c) said bore having an inlet end and an outlet end;

d) said base portion including a generally V-shaped channel formed therein adjacent to and intersecting said bore and lying in a plane containing said bore axis; and, e) a cord latching element positioned within said V-shaped channel and pivotally mounted on said base portion, said cord latching element having an inboard face defining a portion of the wall of said bore adjacent at least said inlet end of said bore;

whereby, when a cord is threaded through said bore from said inlet end to said outlet end and said bore wall-defining portion of said cord latching element is generally parallel to said bore axis, said adjustable hook is free to slide along, and relative to, the cord in either direction; and, when the portion of the cord projecting out of said inlet end-of said bore is turned to an acute included angle relative to said bore axis, said cord latching element is pivoted to a position wherein the end of said cord latching element closest to said bore outlet end projects into said bore, reduces the diameter of said bore, and clamps the cord against the opposite side of the bore wall so as to prevent movement of the cord from said bore inlet end towards said bore outlet end with the portion of the cord projecting out of said bore inlet end maintaining said cord latching element in its pivoted latched state while, at the same time, permitting movement of the cord through said bore from said bore outlet end toward said bore inlet end so as to enable shortening the effective length of the cord and increasing the tension thereon.

* * * * *